Dec. 2, 1941.        E. K. CLARK        2,265,026
THERMOSTATIC MECHANISM
Filed Oct. 13, 1939
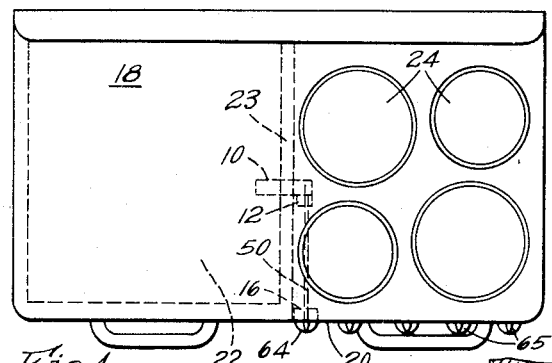
Fig.1.
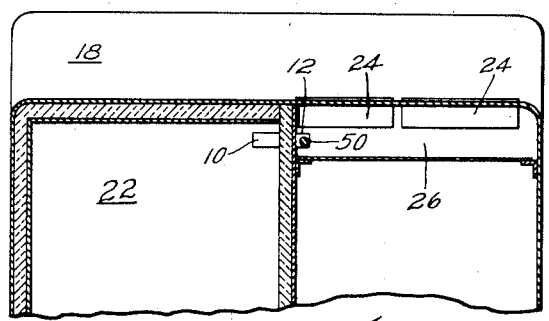
Fig.2.
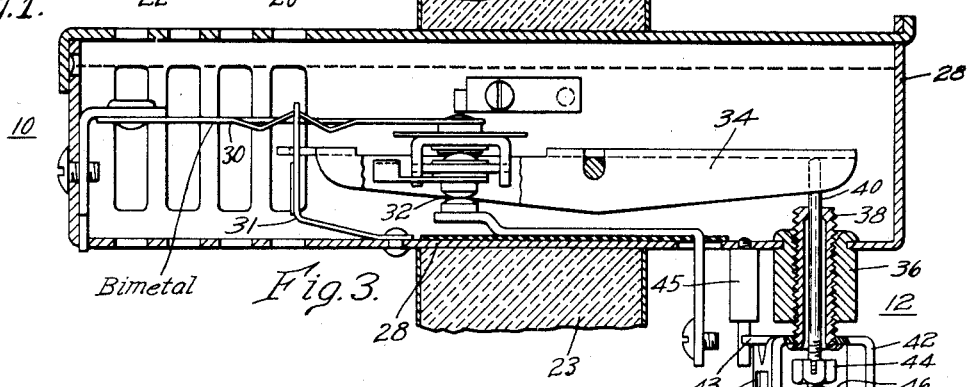
Fig.3.
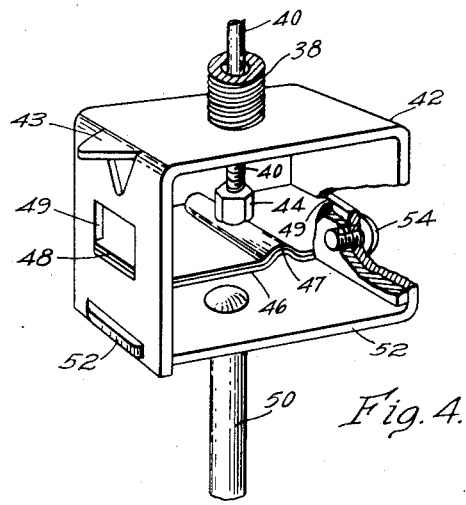
Fig.4.
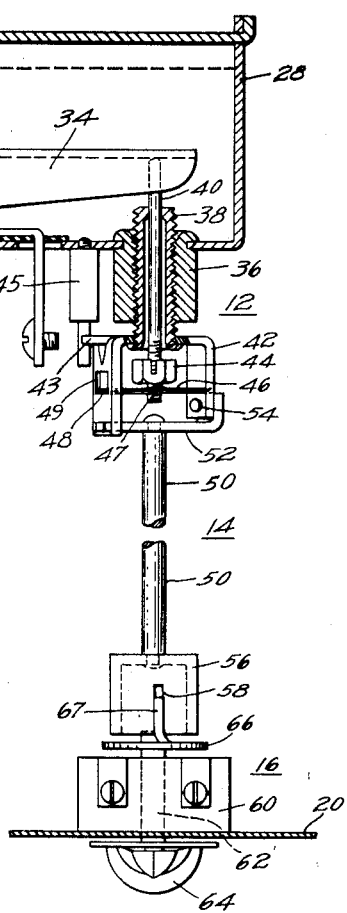
WITNESSES:
C. J. Weller.
H. G. Hepler.
INVENTOR
Earl K. Clark.
BY
W. R. Coley
ATTORNEY

UNITED STATES PATENT OFFICE 2,265,026

THERMOSTATIC MECHANISM

Earl K. Clark, Mansfield, Ohio, assignor to Westinghouse Electric & Manufacturing Company, East Pittsburgh, Pa., a corporation of Pennsylvania Application October 13, 1939, Serial No. 299,331

2 Claims. (Cl. 297—15)

My invention relates to thermostats and, more particularly, to a compensating adjusting mechanism for thermostatic devices.

With the continued development and improvement of electric ranges, it has become apparent that such structures must be originally constructed so that they may be serviced without the necessity of moving them from their operating position in the kitchen. This means, among other things, that the oven control apparatus such as the thermostat, or the like, which it is occasionally necessary to service, must be positioned away from the rear wall. The most suitable position under these circumstances is one which is adjacent the range surface units or "heater box." By placing the oven thermostat adjacent or partially extending into the heater box we encounter serious operating difficulties, inasmuch as the temperature within such box varies from room temperature, with all the surface units disconnected, to a temperature of approximately 350° with all the units or heaters connected to the supply circuit in their "high" positions. This condition causes the oven thermostat to receive a portion of its operating heat from the heater box. Accordingly, the actual oven temperature with its thermostat set at, say, 400°, may change from 400° to substantially 300° as the heater box increases in temperature to its maximum value. The use of insulating material positioned about the thermostat has been suggested but has been found to be unsatisfactory. The only satisfactory method has been found to be one which compensates for the rise in temperature of the heater box.

It is, therefore, an object of my invention to provide an oven thermostat having a temperature compensator associated therewith which will independently adjust the thermostat so as to maintain a substantially constant oven temperature.

A further object of my invention is to provide a temperature compensator for a thermostat which will adjust the operations of the thermal-responsive element thereof with the changes in ambient temperature.

Another object of my invention is to provide a thermostat control or adjusting device for regulating the operation of a thermostat in combination with a thermal responsive element for additionally adjusting the thermostat to compensate for changes in the temperature of the associated atmosphere.

Other objects of my invention will either be pointed out specifically in the course of the following description embodying my invention, or will be apparent from such description.

In the accompanying drawing:

Figure 1 is a top plan view of a range structure having a thermostatic control mechanism embodying my invention associated therewith;

Fig. 2 is a sectional view taken along the line II—II of Fig. 1;

Fig. 3 is an enlarged view illustrating the mechanism embodying my invention associated with a thermostatic device; and Fig. 4 is an enlarged perspective view of my compensating mechanism.

Referring to the accompanying drawing, in which like reference characters indicate like parts in the several figures, I show a thermostat 10, a compensating thermostatic adjusting screw assembly 12, a main adjusting screw assembly 14 and an operating mechanism 16 associated with a suitable range structure 18 having a suitable switch panel 20, oven 22, surface heaters 24 and a heater box 26.

The thermostat 10 illustrated in the accompanying figures is more clearly shown and described in my copending application Serial No. 236,226, filed October 21, 1938, now Patent No. 2,194,999, dated March 26, 1940, and assigned to the assignee of the present invention. Such thermostatic structure comprises, in general, a casing 28 and a bimetallic element 30 having cooperating contacts 32 operatively associated therewith. The operation of the bimetallic element is controlled by means of an operating arm 34 which, in turn, is adjusted by means of an adjusting assembly 12, an element of which passes through a threaded bushing 36 rigidly attached to the casing 28.

The arm 34 is, in this instance, biased in a clockwise direction by means of the bimetallic element 30 and an intermediate resilient member 31. This feature ensures a positive downward biasing action upon the adjusting assembly 12 at all times. It is to be understood, however, that the operating arm and bimetallic element 30 may be adjusted by means of any other suitable mechanism passing through the bushing 36. However, it is preferred that such adjusting mechanism be of the compensated type hereinafter described.

The thermostat 10 extends through the oven wall 23 of the range 18 with a portion thereof being within the oven 22 and a portion within the heater box 26. The compensating screw assembly 12 is associated with the end of the thermostat which extends into the box 26. The temperature of the assembly 12 is, therefore, dependent upon the temperature within the box 26. In contrast with this, the temperature of the bimetal 30 of thermostat 10 depends upon both the heat within the oven 22 and the heat within the heater box 26. However, the compensating assembly 12 compensates for the heat received by the bimetal 30 from box 26, as hereinafter described.

The compensating thermostatic adjusting screw assembly 12 comprises, in this instance, an exteriorly threaded screw sleeve 38 which is adapted to be threadedly mounted within the bushing 36, a direct operating pin 40 slidably mounted within the screw 38, a U-shaped bracket 42 rigidly attached to the free end of the threaded screw sleeve 38, and a temperature adjusting nut 44 which is threadedly positioned upon the free end of the operating pin 40 and operatively associated with a compensating bimetal 46.

The exteriorly threaded screw sleeve 38 has, in this instance, a sleeve bearing surface located within its upper end for centering the operating pin 40. The lower end of the screw sleeve 38 is rigidly attached to the center portion of the U-shaped bracket 42 by being spun tightly over thereagainst. Accordingly, it is obvious that as the U-shaped bracket 42 is rotated, the screw sleeve 38 will likewise be rotated within the threaded bushing 36, and will move longitudinally along the axis thereof.

The pin 40 cooperates with the thermostat operating arm 34 and is biased downwardly by such arm and its associated bimetallic member 30 and resilient member 31. However, the position of such pin 40 is determined by the cooperation of adjusting nut 44 with the compensating bimetallic member 46, as hereinafter described.

The U-shaped bracket 42 comprises, in this instance, a relatively narrow strip having depending end portions, and an outwardly extending tongue 43 positioned substantially in the plane of the main horizontally extending portion of the bracket 42 to cooperate with a suitable stop member 45 as a means for limiting the rotation of such bracket. The depending end portions of the bracket 42 have a plurality of apertures 49 positioned therethrough to afford means for rigidly mounting the bimetallic member 46 and operating bracket 52 as hereinafter described.

The temperature compensating bimetal 46 comprises an elongated bimetallic strip type member having an upwardly transversely extending hump or ridge 47 located substantially midway the ends thereof. In addition, there is an aperture located within said hump to permit the lower end of the downwardly biased operating pin 40 to pass therethrough. The bimetallic member 46 has, in this instance, an outwardly extending tongue 48 positioned along each end thereof to cooperate within the corresponding apertures 49 within the depending end portions of the bracket 42. The cooperation of such tongues with the apertures in the U-shaped bracket 42 affords means for supporting such bimetallic member within the bracket.

The bimetallic member 46 is positioned within the U-shaped bracket 42 in such a manner that as the ambient temperature associated therewith increases in value, the bimetallic member will flex downwardly and, conversely, as the temperature decreases such member will flex upwardly. The bimetallic member 46 is adapted to engage the lower surface of the downwardly biased adjusting nut 44 through the cooperation of the upwardly extending transverse ridge 47. The cooperation of the downwardly biased nut 44 with member 46 retains such member in an operative position within the bracket 42.

It is obvious that by running the nut upwardly along the lower end of the pin 40, the operating arm 34 of the thermostat 10 will move downwardly. This has substantially the same effect as an increase in the ambient temperature or the downward flexing of the bimetallic member 46. The temperature adjusting nut 44 may thus be used to adjust the operation of the thermostat so that it will operate within predetermined desired limits.

The main temperature adjusting screw assembly 14 comprises, in this instance, an elongated shaft 50, an operating bracket 52 at one end and a slotted cup-shaped bushing 56 at the other end thereof. The drive shaft 50 is, in this instance, adapted to extend from the thermostat located within the range 18 outwardly to the operating mechanism 16 mounted upon the switch panel 20 of such range, (see Fig. 1). It is to be understood that the drive shaft 50 may be of any length desired and any other suitable desired structure may be employed in lieu of such shaft. The bracket 52 is, in this instance, substantially an L-shaped member, the horizontal longer arm of which is rigidly attached to the upper end of the shaft 50, see Fig. 3. Such bracket 52 is operatively associated with the U-shaped bracket 42 by having said horizontal arm engage with a tight tongue-and-groove connection, the left-hand depending side of the U-shaped bracket 42. The other or shorter arm end of the bracket 52 is rigidly attached to the second or right-hand depending side of the U-shaped bracket 42 by means of a suitable screw 54. It is, therefore, apparent that as the main drive shaft 50 is rotated, the bracket 52, through its cooperation with the U-shaped bracket 42, will rotate the compensating thermostat adjusting assembly 12.

The slotted cup-shaped bushing 56 is rigidly attached to the lower end of the drive shaft 50, in this instance, to afford means for flexibly connecting such drive shaft to a suitable operating member. The cup-shaped bushing has upwardly extending asymmetrically positioned or polarized slots 58 located therein to provide means for flexible cooperation with a suitable complementary slotted key washer 66 as hereinafter described. Inasmuch as the bushing 56 is rigidly attached to the shaft 50, it follows that as such bushing is rotated this shaft 50 and bracket 52 will likewise be rotated.

The polarized washer 66 is formed from a common flat washer having a keyed aperture therethrough for cooperation with shaft 62 of mechanism 16. A plurality of asymmetrically located ears 67 are punched therein to form polarized members which are adapted to cooperate with the bushing 56 only when the washer 66 and the operating mechanism 16 are in their correct position with respect to the adjusting screw assembly 14.

The operating mechanism 16 comprises, in this instance, a standard switch assembly 60 which is mounted on the inner surface of the switch panel 20 in any well known manner, the operating shaft 62 extending through the switch panel 20 and switch assembly 60. A control knob 64 is located or positioned upon the outer end of the operating shaft 62, in front of the range (see Fig. 1) while the key-washer 66 is rigidly attached to the inner end of the control shaft 62. The switch assembly 16 is, in this instance, used merely for illustrative purposes and may be any suitable switch capable of selectively operating the range oven heating elements in a well known manner.

The control knob 64, through the cooperation of the switch assembly 60, is thus adapted to selectively connect the oven heating elements, not shown, to a suitable supply circuit, not shown, in any desired manner, as will be readily understood. However, it follows that inasmuch as the key-washer 66 is rigidly attached to the inner end of the operating shaft 62 and is operatively associated with the cup-shaped bushing 56, the temperature adjusting screw assembly 14 and compensating thermostatic adjusting screw assembly 12 will be simultaneously rotated with the knob 64.

When operating the oven thermostat 10 by means of knob 64 with the compensating adjusting mechanism 14 associated therewith, it follows that the thermostat 10 may be selectively controlled by means of the control knob 64 and may be independently controlled by the bimetallic member 46 as hereinabove described. It, therefore, further follows that when an operator sets the oven thermostat 10 to its predetermined value by means of the control knob 64, and connects the oven heating elements to a suitable supply circuit by means of the standard switch assembly 60, the compensating thermostatic adjusting screw assembly 12 will be in a position to independently adjust the oven thermostat 10.

However, with the range surface heating elements 24 disconnected from the supply circuit, the temperature within the heater box 26 will remain substantially uniform depending upon the amount of insulation between the oven wall and such heater box. The compensating bimetal 46 being located within such box 26 will thus remain in its original position, permitting the bimetallic element 30 to operate at its predetermined set value.

However, assuming that one or all of the surface heaters 24 are connected to the supply circuit, by means of switch handles 65 or any other suitable means, it follows that heat developed by such heaters will be present within the heater box 26. Such heat will, in turn, be conveyed to the bimetallic element 30. In other words, the bimetallic element 30 will receive heat from both the oven heating elements and the surface heaters and its heating and cooling rate is thus governed thereby. Accordingly, due to the additional heat received from the heater box 26, the bimetallic element 30 would operate the thermostat 10 at a point somewhat below the predetermined set value for the oven temperature. This point or oven temperature at the time of operation of such thermostats would vary inversely with the change in temperature of the box 26. It, therefore, follows that the oven thermostat 10 would operate at a false or reduced value depending upon the amount of heat produced by the range surface heaters.

However, the compensating bimetallic member 46 located within the heater box 26 and operatively associated with the main bimetallic element 30 compensates for such increase in temperature of the bimetallic element 30 by increasing the operating temperature of such thermostat in direct proportion to the amount of heat received from the heater box 26. In other words, as the surface heaters 24 are energized and the temperature of the heater box 26 increases, the bimetallic element 46 thermally associated therewith will flex downwardly a corresponding amount. This action permits the pin 40 to also move downwardly within the screw sleeve 38 in response to the biasing action conveyed thereto by the thermostat arm 34. Accordingly, the arm 34 will rotate in a clockwise direction.

This, in turn, increases the operating temperature of the thermostat 10 so that such thermostat, which now receives temperature from two sources, will operate so as to maintain a substantially uniform temperature within the oven 22.

Then after the heaters 24 have been deenergized and the temperature of the heater box 26 gradually returns to its normal value, the compensating bimetallic element 46 will gradually return to its normal position, which, simultaneously, returns the pin 40 and the operating arm 34 to their normal position so as to lower the operating temperature of the thermostat 10 to its original predetermined set value corresponding to the desired oven temperature.

It is, therefore, obvious that the bimetallic compensating member 46 compensates for any changes in the ambient temperature which would otherwise cause the thermostatic device 10 to provide a false or reduced temperature value within the oven 22.

Various modifications may be made in the device embodying my invention without departing from the spirit and scope thereof, and I desire, therefore, that only such limitations shall be placed thereon as are imposed by the prior art and the appended claims.

I claim as my invention:

1. In a thermostatic structure, the combination of a casing, a thermal-responsive element, a bushing rigidly attached to the casing and an adjusting mechanism rotatively inserted through the bushing and operatively associated with such element for regulating the operations thereof, said mechanism comprising a yoke, a threaded sleeve rigidly attached to the yoke and threadedly engaged with the bushing, a bimetallic element spanning the yoke and attached thereto, a pin positioned within the sleeve and operatively associated with the element, and means associated with the yoke for rotating the yoke, bimetal and pin to adjust the operation of the thermostat, said bimetallic element independently adjusting the thermostat through said pin.

2. In a thermostatic structure, the combination with a casing, a thermal responsive element disposed in said casing, a bushing rigidly attached to the casing and an adjusting mechanism having a pin rotatively and longitudinally movable through said bushing and having one end operatively associated with said element for regulating the operations thereof, said mechanism comprising a yoke, a threaded sleeve movable with the yoke and threadedly engaged with said bushing, a bimetallic element mounted in the arms of said yoke, said pin having its other end mounted on said bimetallic element, and means in substantial alinement with said pin and secured to said yoke for rotating said yoke, sleeve, and bimetallic element for changing the position of said pin to regulate the operations of said thermal responsive element.

EARL K. CLARK.